July 23, 1957     L. F. ROWE     2,799,862
EYE PROTECTIVE MEANS
Filed July 19, 1954     2 Sheets-Sheet 2
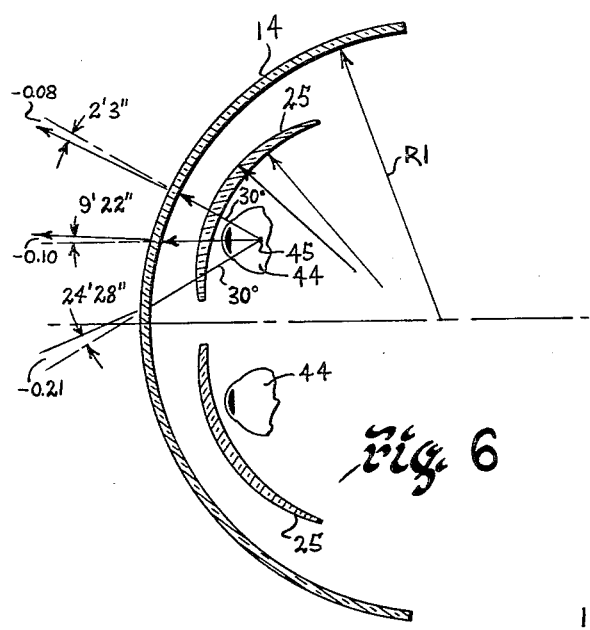
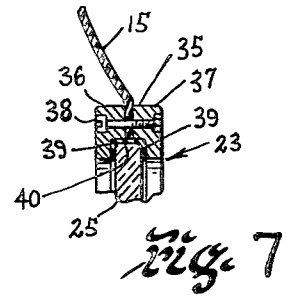
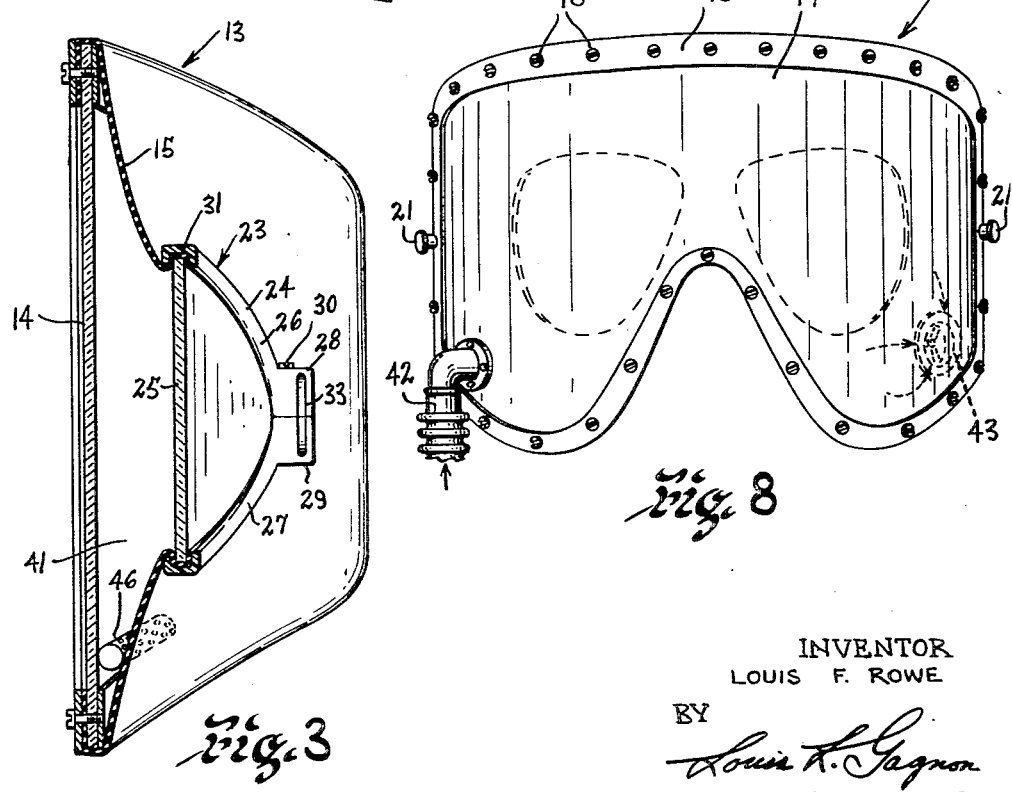
INVENTOR
LOUIS F. ROWE
BY
Louis L. Gagnon
ATTORNEY United States Patent Office 2,799,862
Patented July 23, 1957

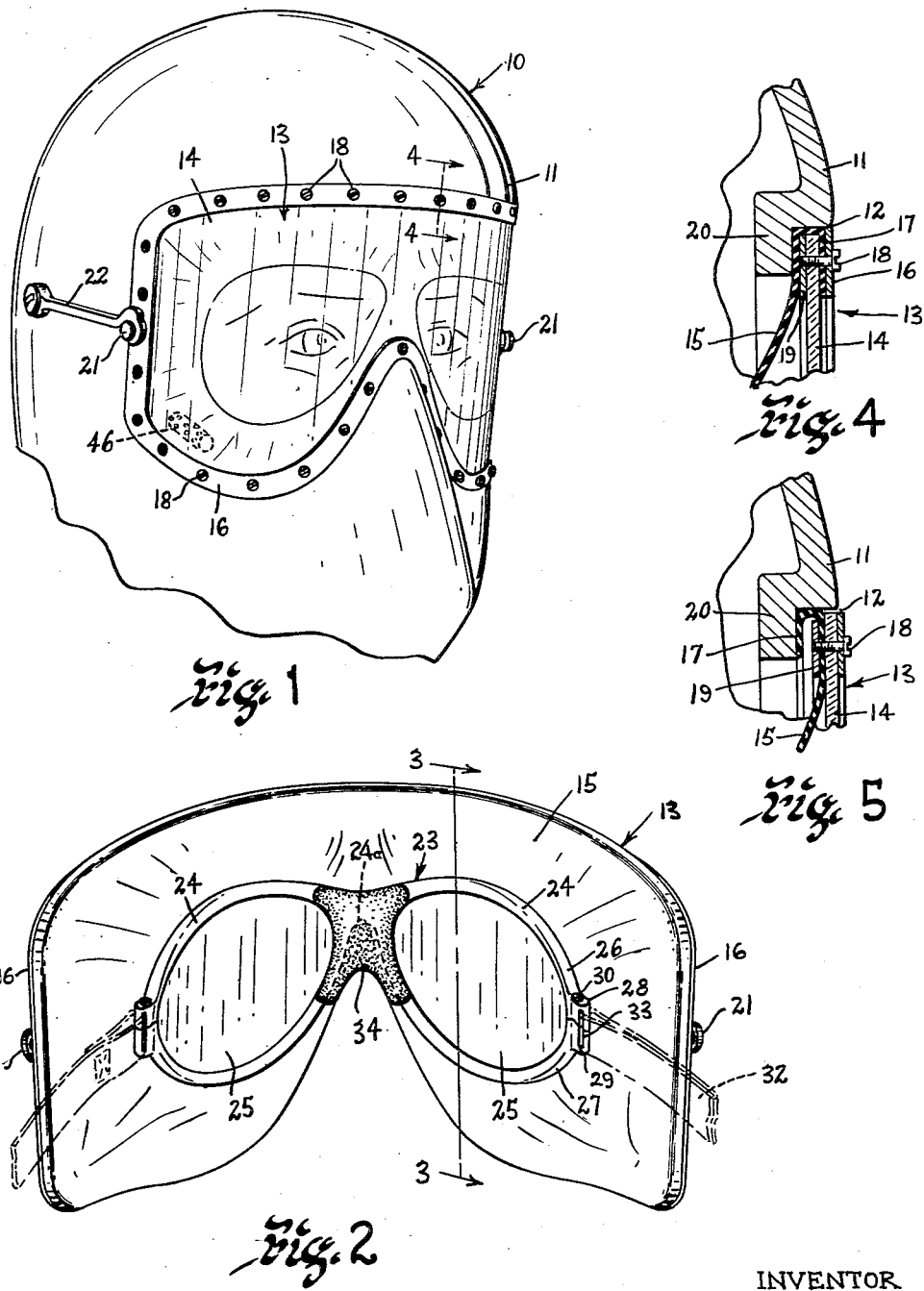

2,799,862

EYE PROTECTIVE MEANS

Louis F. Rowe, North Woodstock, Conn., assignor to American Optical Company, Southbridge, Mass., a voluntary association of Massachusetts Application July 19, 1954, Serial No. 444,193

8 Claims. (Cl. 2—9)

This invention relates to improvements in eye protective means and has particular reference to the provision of novel transparent eye protective devices and method of making the same.

The prior art teaches many means and methods of forming transparent eye protective devices suitable for use at low temperatures or under conditions wherein the transparent portions of the devices normally become fogged or misted. Eye protective devices for use by aviators at high altitudes, for example, embody various types of structures which are formed, at least in part, of transparent elements. Such structures, however, are unsuitable because of undesirable fogging of the transparent elements due to differences in temperatures of the inner and outer surfaces of the transparent elements at high altitudes and consequently low temperatures or because of accumulation of moisture laden air upon the transparent elements because of other conditions. Fogging or misting has also been found to be a problem in the manufacture of underwater goggles, ski goggles, or the like. In designing eye protective devices according to prior art teachings, the eye protective devices are sometimes provided with transparent eye shields having variously curved shapes which thus possess inherent optical errors such as prism and/or undesired optical power. Such eye shields are sometimes believed responsible for causing illness on the part of the wearers, as well as causing faulty vision.

Attempts have been made to overcome some of the problems found to exist in prior art devices such as by embedding heating wires in the material of the transparent elements or by applying to the surfaces of the transparent elements electrically conducting transparent layers. Thus by heating the transparent elements to a temperature above the dew point it has been found that fogging, misting or frosting can be substantially eliminated. Other attempted solutions to the problem have embodied means for maintaining a constant flow of warm dry air over the surface or surfaces which normally collect moisture, thus preventing fogging of those surfaces.

None of the known solutions to this problem have been entirely satisfactory however being expensive, impractical, cumbersome, delicate, complicated or otherwise objectionable.

The present invention is directed to overcoming the disadvantages known to exist in prior art eye protective devices and it is, accordingly, a primary object of this invention to provide improved eye protective devices constructed and arranged to substantially eliminate undesirable fogging or misting of the transparent portions thereof.

Another object is to provide an improved eye protective device comprising a strip of transparent material and a superimposed air-separated membrane of flexible non-porous material sealed throughout its periphery to the transparent material and having mounted therein goggles adapted to be positioned over the eyes of a wearer, the chamber between the strip of transparent material and the membrane being occupied by a supply of dry gas such as air for preventing fogging of either the transparent material or the goggle lenses.

Another object is the provision of an eye protective device of the above character wherein the lenses of the goggles are provided with predetermined optical characteristics designed to substantially compensate for or correct optical errors inherent in the transparent member.

A further object is to provide an eye protecting device of the above character for helmets such as the type worn by aviators and wherein the warm dry gas within the chamber between the transparent shield and the membrane carrying the goggles may be introduced from an oxygen supply or the like and exhausted or evacuated into the interior of the helmet through a suitable valve after flowing across the adjacent surfaces of the transparent shield and goggle lenses, thus preventing the undesired fogging, frosting or misting of the surfaces of the various transparent elements of the device which are exposed to high humidity.

A still further object is to provide an improved eye protective device particularly useful and efficient for use at low temperatures which is relatively simple in construction and use, relatively economical to manufacture, light in weight and thus relatively comfortable to wear, and one which, in its preferred form, is unencumbered by separately attached electrical wiring, air lines, or the like.

A still further object is to provide a helmet having an eye protective device of the above character embodied therein.

Other objects and advantages of this invention will become apparent from the following description taken in connection with the accompanying drawings wherein:

Fig. 1 is a fragmentary perspective view of a preferred form of the invention illustrated as applied to an aviator's helmet;

Fig. 2 is an enlarged rear view of the eye protective device shown in Fig. 1;

Fig. 3 is an enlarged vertical sectional view taken substantially on line 3—3 of Fig. 2 looking in the direction of the arrows;

Fig. 4 is an enlarged vertical sectional view taken substantially on line 4—4 of Fig. 1 looking in the direction of the arrows;

Fig. 5 is a view similar to Fig. 4 showing a modification in the method of securing the inner non-porous layer to the outer layer of the device;

Fig. 6 is a diagrammatic illustration of one example of the optics involved in correcting errors inherent in an eye shield;

Fig. 7 is a fragmentary vertical sectional view showing a modified method of securing lenses in a goggle frame; and Fig. 8 is a front elevational view of the eye protecting device illustrating a method of supplying dry gas thereto.

Referring more particularly to the drawings wherein like characters of reference designate like parts throughout the several views, the preferred form of eye protective device embodying the invention, as illustrated in Fig. 1, is applied to a helmet 10 shaped to fit over and enclose the wearer's head. The helmet 10 is preferably formed of a relatively rigid shape-retaining material of a durable nature and which is impervious to passage of air therethrough. Such a helmet 10 should be able to protect the wearer from high velocity air streams which might contain foreign matter, should be impervious to noxious gases and fumes, and should also be rugged enough to withstand and protect the wearer's head from shock.

The portion of the front 11 of the helmet which would normally cover the eyes of a wearer is removed to form an aperture 12 (Fig. 4) in which is positioned an eye protective device 13. The eye protective device 13 comprises a shield of transparent glass, plastic, or like material which is horizontally curved substantially to the curvature of the face, as indicated by radius R1 in Fig. 6, while flat in the vertical plane. This curvature is such as to also provide wide angle vision. The sheet is of substantially equal thickness throughout and so forms an eye shield 14 which is substantially a cylinder lens. To the periphery of the eye shield 14 is attached the corresponding edge of a non-porous membrane 15 formed of rubber, plastic or similar relatively flexible yet durable material. The membrane 15 overlies the inner curved surface of the eye shield 14 and, in the preferred construction shown in Figs. 2 and 4, covers the entire peripheral edge of the shield 14 and overlaps slightly the outer surface thereof. A metal or other suitable frame 16 is mounted over the overlapping portion 17 of the membrane and is held thereupon to firmly secure the overlapping portion 17 against the surface of the eye shield 14 by means of a plurality of screws 18 or the like, the screws 18 extending through the frame 16, overlapping portion 17, and eye shield 14 into an inner frame 19 which is thus held against the inner surface of the eye shield 14. This forms an air-tight seal around the periphery of the eye protective unit 13.

The helmet 10 is provided throughout the edge of the aperture 12 with a rearwardly and inwardly extending flange 20 forming a shelf upon which the edge of the eye protective unit is adapted to be positioned. The outer frame 16 carries at each end a stud 21 to which hooks or latches 22 carried by the sides of the helmet 10 are adapted to be secured in the usual manner. In this way the eye protective unit 13 can be drawn into snug engagement with the flange 20 and held thereagainst.

A modified but satisfactory way of securing the membrane 15 to the eye shield 14 is shown in Fig. 5 wherein the membrane 15 is held between the inner frame 19 and adjacent surface of the eye shield 14 by the screws 18 and the portion 17 of the membrane 15, instead of overlying the edge and outer surface of the eye shield 14, is turned rearwardly and inwardly to overlie the exposed surface of the inner frame 19 and adjacent surface of the flange 20. When the eye protective device 13 is drawn toward the flange 20 by the latches 22 the portion 17 of the membrane 15 becomes firmly wedged between the flange 20 and inner frame 19. Air pressure within the chamber will also aid in further sealing the device from leakage of air or gas from an outside source into the chamber 41.

The membrane 15 is provided with a pair of spaced eye openings in which a pair of goggles or lens supports 23 are positioned (Figs. 2 and 3). The goggles or lens supports 23 are preferably formed with a metal or plastic frame having encircling rims 24 which are joined in the bridge area 24a of the device. The rims 24 are shaped substantially to the shape of the eye openings in the membrane 15 and of the lenses 25 to be assembled therewith. The inner surface of each rim 24 is grooved (Fig. 3) to receive the peripheral edge of the respective lens 25, the rims 24 being split at the outer sides thereof to form upper and lower rim portions 26 and 27 respectively each having an enlarged end portion 28—29 which is secured together as by a screw 30 to hold the lens 25 in place. The edge portions 31 of the eye openings of the membrane 15 are positioned within the grooves in the rim portions 26—27 and when the enlarged end portions 28—29 of the upper and lower rim portions 26—27 are clamped together by the screw 30 the edge portions 31 of the membrane 15 become firmly secured in place, providing a tight gas seal between the goggles and membrane 15. With such a construction it is apparent that the goggles or lens supports can be adjusted, within the limits permitted by the flexible membrane 15, on the face of the wearer.

The rims 24 are also preferably shaped to curve rearwardly to substantially the shape of the area around the wearer's eyes so that they will tend to form a chamber between the eyes and the lenses 25. Such a chamber will collect and hold body heat and thus prevent fogging or misting of the surfaces of the lenses 25.

If desired a headband 32 may be connected with slots 33 in the enlarged end portions 28—29 of the frame to extend around the head of the wearer to fit the goggles firmly over the wearer's eyes. To provide an additional measure of comfort, a nose pad 34 of sponge rubber or similar soft resilient material may be secured to the nasal or bridge portion 24a of the goggle or lens support frames. A modified means for securing the goggles or lens supports in the eye openings of the membrane 15 is shown in Fig. 7 wherein the rim portions 35 are formed as two annular members 36 and 37 which are adapted to be secured in superimposed relation as by screws or bolts 38 with the edge portion of the membrane 15 adjacent each eye opening being secured between the annular members 36—37. Each annular member 36—37 is grooved as at 39 on the inner adjacent edge thereof to form one continuous groove in which a channel-shaped portion 40 of the membrane 15 is positioned. The channel-shaped portion 40 is fitted over the peripheral edge of the respective lens 25 and thus, when the screw or bolt 38 is tightened the annular members firmly clamp the lens 25 in place with the channel-shaped portions 40 of the membrane sealing the adjacent edges of the lenses 25 and rim portions 35 from passage of air or gas.

In accordance with this invention the chamber 41 between the eye shield 14 and the membrane 15 must be occupied by either a dormant dry gas or by a continuously moving supply of dry warm gas. Therefore, it is desirable that perforated capsules 46 containing a moisture-absorbing ingredient such as silicate gel, calcium chloride, charcoal, or the like be placed in the chamber 41 to absorb the moisture in the gas in chamber 41. The capsules 46 may be free to move about within the chamber 41 or may be taped, sewed, or otherwise secured in place if desired. Also if desired, the silicate gel or other selected moisture-absorbing ingredient may be deposited in the form of little pellets or the like in the chamber 41 without the use of the capsules 46. Any such or similar method of removing moisture from the gas in chamber 41 will provide satisfactory results in accordance with this invention whereby only dry gas is allowed to come into contact with the adjacent surfaces of the eye shield 14 and lenses 15 to prevent fogging or misting thereof.

If it is desired to provide a flow of gas through chamber 41, this can be done by forcing warm dry oxygen through an oxygen supply tube 42 (Fig. 8), which may be connected with any suitable supply of oxygen, into the chamber 41 and allowing the oxygen to escape into the interior of the helmet 10 by means of a conventional disk- or flutter-valve 43. If the intake is located at one end of the unit 13 and the valve 43 located at the opposite end, it is apparent that the natural breathing of the wearer will cause the oxygen to flow through the chamber 41 whereby the eye shield and lenses will be prevented from fogging, frosting or misting.

While the eye shield 14 has been described as being preferably curved to the contour of the face so as to fit relatively intimately therewith and also to provide a wide angle field of vision, it has been found that due to this curving of the shield and to the thickness thereof undesirable prismatic and astigmatic errors may be introduced and such errors increase with the shortening of the radius of curvature of the shield.

The lenses 25, while functioning in the manner previously described, afford means for compensating for the errors introduced by the transparent shield 14. This is done by forming the opposed surfaces thereof to shapes which are so correlated in accordance with the thickness thereof as to introduce optical characteristics for substantially neutralizing the errors introduced by said shield 14. For example, assuming that the eye shield 14, in the absence of the lenses 25, is of a thickness of 3.2 mm. and is curved to a radius of 117.5 mm., as illustrated in Fig. 6, the line of straight ahead vision of both eyes through said shield 14 will introduce a prism imbalance of .54Δ and also introduce a cylindrical power of −0.10 D. When the line of sight is at a 30° angle to the right of said line of straight ahead vision a prism imbalance of .65Δ is introduced with a power of −0.08 D. cyl. in the right eye and −0.21 D. cyl. in the left eye. When the eyes are looking at 30° to the left of said line of straight ahead vision there is a prism imbalance of .65Δ with a power of −0.21 D. cyl. in the right eye and −0.08 D. cyl. in the left eye. In all cases the prism is base out and the cylinder axis is in the 90° meridian. It is apparent that the lenses 25 may each be provided with about 0.3Δ base in and +0.12 D. cyl. with the axis in the 90° meridian and will thereby substantially compensate for the errors in the eye shield 14 along said different lines of vision to a degree within tolerable limits.

This is illustrated diagrammatically in Fig. 6 wherein the eyes of the wearer are indicated by numeral 44 and the measurements are computed using the center of rotation 45 of the eye as an axis. Also assumed in this computation is 64 mm. P. D., 117.5 mm. radius for R1 and eye shield thickness of about 3.2 mm.

It is to be understood, of course, that the above is an example only, and that eye shields having other curvatures or thicknesses would require lenses having different optical characteristics.

It has been found that the presently described eye shield 14 is so improved over known prior art devices of this type that in many instances where the thickness of the eye shield 14 is relatively small and/or the radius of curvature R1 is relatively long, the device is acceptable without the requirement of lenses 25 shaped to compensate for such small errors as exist in the eye shield 14.

The lenses 25 may, of course, be optically designed also to correct errors in the wearer's normal vision if necessary and such correcting characteristics would be incorporated in the lenses in addition to the above correction of the errors introduced by the curved shield 14.

Although the invention has been shown and described as applied to an aviator's helmet, it is to be understood that eye protective devices embodying this invention can be used for other purposes such as for ski goggles, underwater goggles, or arctic eye protective devices where it is desirable that no fogging, frosting or misting of the lenses occur and where accurate vision is also advantageous.

From the foregoing description it is apparent that all of the objects and advantages of the invention have been accomplished by providing an improved eye protective device which will not become fogged or frosted, which is unencumbered by heating wires or the like, and which is of improved optical design.

It will also be apparent that changes may be made in the details of construction and arrangement of parts shown and described without departing from the spirit of the invention as expressed in the accompanying claims. Therefore, it is to be understood that all matter set forth or shown in the accompanying drawings is to be interpreted as illustrative and not in a limiting sense.

I claim:

1. An eye protective device comprising an eye shield formed of transparent material, a membrane overlying the inner surface of the eye shield and attached throughout its peripheral edge to said eye shield in air-sealing relation therewith, said membrane having eye openings therein, lens supporting means carried by said membrane and secured in said eye openings in air-sealing relation with said membrane, and corrective lenses sealed in said lens supporting means, said membrane being of a relatively flexible non-porous nature permitting the lens supporting means limited movement relative to the eye shield whereby they may be adjusted on the face of a wearer independently of said eye shield and further forming a sealed chamber between it and said eye shield, and means in said chamber for absorbing moisture from the air therein.

2. An eye protective device comprising an eye shield formed of transparent material, a flexible non-porous membrane overlying the inner surface of the eye shield and attached throughout its peripheral edge to said eye shield in air-sealing relation therewith, said membrane having eye openings therein, lens supporting means carried by said membrane and secured in said eye openings in air-sealing relation with said membrane, and corrective lenses having their peripheral edges sealed in said lens supporting means, said membrane being of a relatively flexible nature permitting the lens supporting means limited movement relative to the eye shield whereby they may be adjusted on the face of a wearer independently of said eye shield and further forming a sealed chamber between it and said eye shield, means connected with said eye protective device for permitting entrance of dry air only into said chamber, and means connected with said chamber for permitting said dry air in the chamber to be exhausted.

3. An eye protective device comprising a substantially cylindrical outer lens, a flexible non-porous membrane overlying the inner surface of the outer lens and attached throughout its peripheral edge to said outer lens in air-sealing relation therewith, said membrane having eye openings therein, goggles carried by said membrane and secured thereto in air-sealing relation with the edges of said openings comprising a frame and optical lenses sealed in said frame, said optical lenses being optically designed to reduce to a negligible degree optical errors inherent in said outer lens along different paths of vision therethrough, said membrane being of a relatively flexible nature so as to permit the goggles freedom of movement relative to the cylindrical outer lens in adjusting themselves on the face of a wearer independently of said eye shield and further forming a sealed chamber between it and said eye shield, and a headband secured to said frame for aiding in supporting the goggles in position of use.

4. A head protecting device embodying a helmet shaped to cover the head of a wearer and having an aperture therein in the area adapted to be located in the line of vision of the wearer, an eye protective device shaped to interfit with said aperture comprising an eye shield formed of transparent material, a flexible non-porous membrane overlying the inner surface of the eye shield and attached throughout its peripheral edge to said eye shield in air-sealing relation therewith and in air sealed relation with the helmet throughout the aperture, said membrane having eye openings therein, lens supporting means carried by said membrane and secured in said openings in air-sealing relation with said membrane, corrective lenses sealed in said lens supporting means, said membrane being of a relatively flexible nature so as to permit the lens supporting means limited movement relative to the eye shield and further forming a sealed chamber between it and said eye shield whereby they may be adjusted on the face of a wearer independently of the eye shield, and means for retaining said eye protective device before the eyes of the wearer in said helmet.

5. A head protecting device embodying a helmet shaped to cover the head of a wearer and having an aperture therein in the area adapted to be located in the line of vision of the wearer, an eye protective device shaped to interfit with said aperture comprising an eye shield formed of transparent material, a flexible, non-porous membrane overlying the inner surface of the eye shield and attached throughout its peripheral edge to said eye shield in air-sealing relation therewith and in air sealed relation with the helmet throughout the aperture, said membrane having eye openings therein, lens supporting means carried by said membrane and secured in said openings in air-sealing relation with said membrane, corrective lenses sealed in said lens supporting means, said membrane being of a relatively flexible nature so as to permit the lens supporting means limited movement relative to the eye shield whereby they may be adjusted on the face of a wearer independently of said eye shield and further forming a sealed chamber between it and the eye shield, means in said chamber for absorbing moisture from the air therein, and means for supporting said eye protective device before the eyes of the wearer in said helmet.

6. A head protecting device embodying a helmet shaped to cover the head of a wearer and having an aperture therein in the area adapted to be located in the line of vision of the wearer, an eye protective device shaped to interfit with said aperture comprising an eye shield formed of transparent material, a flexible non-porous membrane overlying the inner surface of the eye shield and attached throughout its peripheral edge to said eye shield in air-sealing relation therewith and in air sealed relation with the helmet throughout the edge of the aperture therein, said membrane having eye openings therein in line with the eye shield, lens supporting means carried by said membrane and secured in said openings in air-sealing relation with said membrane, corrective lenses sealed in said lens supporting means, said membrane being of a relatively flexible nature permitting the lens supporting means limited movement relative to the eye shield whereby they may be adjusted on the face of a wearer independently of said eye shield and further forming a sealed chamber between it and said eye shield, means connected with said eye protective device for injecting air only into said chamber, means connecting said chamber with the interior of said helmet for permitting said air in the chamber to be exhausted into said helmet, and means for supporting said eye protective device before the eyes of the wearer in said helmet.

7. Eye protective means of the character described comprising an eye shield formed of transparent material, a non-porous membrane overlying the inner surface of the shield and attached throughout its peripheral edge to said eye shield in air sealing relation therewith, said membrane having eye openings therein, lens supporting means secured inwardly of said eye openings in air sealing relation with the edges of said openings and corrective lenses sealed in said lens supporting means, said membrane being of a relatively flexible nature permitting the lens supporting means freedom of movement relative to the eye shield in adjusting themselves on the face of the wearer independently of the eye shield and further forming a sealed chamber between said membrane and shield.

8. In an eye protective device embodying a shield of relatively thin transparent sheet material of substantially uniform thickness shaped to a predetermined cylindrical arc whose curvature in the horizontal direction is such as to have proper fit about the face before the eyes of the wearer, said curvature in said horizontal meridian being about a center located rearwardly of the eyes and being such that the shield along different lines of vision within the normal usable range of vision of the eyes will be disposed at angles other than normal to said lines of vision thereby introducing prismatic and cylindrical powers which increase with the increase of angle of said shield and a pair of corrective lens members, one supported before each respective eye between said shield and eye and having prismatic and cylindrical powers along said different lines of vision which are substantially opposite to the prismatic and cylindrical powers introduced by said different angles of the shield whereby the errors of vision through said combined shield and lens members will be reduced to a negligible amount.

References Cited in the file of this patent
UNITED STATES PATENTS

| | | |
|---|---|---|
| 1,098,905 | Jacob et al. | June 2, 1914 |
| 1,996,587 | Meyrowitz | Apr. 2, 1935 |
| 2,263,116 | Andrews | Nov. 18, 1941 |
| 2,430,881 | Lehmberg | Nov. 18, 1947 |
| 2,526,737 | Farina | Oct. 24, 1950 |
| 2,579,942 | MacLean | Dec. 25, 1951 |
| 2,619,643 | Christensen et al. | Dec. 2, 1952 |
| 2,619,644 | Christensen et al. | Dec. 2, 1952 |

FOREIGN PATENTS

| | | |
|---|---|---|
| 419,669 | France | Nov. 2, 1910 |
| 434,323 | Great Britain | Aug. 29, 1935 |